United States Patent [19]

Schneer

[11] 3,828,932

[45] Aug. 13, 1974

[54] ROTARY SWIMMING POOL VALVE

[75] Inventor: Marcel Schneer, Montreal, Quebec, Canada

[73] Assignee: Coleco Industries, Inc., Hartford, Conn.

[22] Filed: Apr. 18, 1973

[21] Appl. No.: 352,108

[52] U.S. Cl............ 210/169, 210/411, 137/625.15, 137/625.46
[51] Int. Cl............................................. E04h 3/20
[58] Field of Search .......... 210/169, 411, 425, 429; 137/625.15, 625.17, 625.18, 625.46; 251/314, 316

[56] References Cited
UNITED STATES PATENTS
2,532,177  11/1950  Maunula............................ 210/411
3,640,310  2/1972  Erlich................................. 210/169

Primary Examiner—Roy Lake
Assistant Examiner—R. Daniel Crouse

[57] ABSTRACT

A multiport rotary valve is provided which is particularly adapted for use in connection with the filtering system for a swimming pool. The rotary valve is capable of being mounted directly onto a filter tank unit whereby in the resulting assembly all of the piping connections between the rotary valve and the filter tank unit are made internally, i.e., within the assembly. The rotary valve includes a dome-shaped cover which comprises a housing for the components of the valve. An externally accessible handle is supported on the housing and is operable for selectively connecting the input ports of the valve to one of the various other ports thereof. For this purpose, the handle is operatively connected to a distributor which is rotatably mounted in a central chamber portion formed in the valve. The rotary valve further includes a gasket carrier which supports a gasket, and an end plate in which there is formed an inlet pressure port as well as a plurality of outlet ports. The gasket carrier and gasket are cooperatively associated with the distributor whereby input fluid flows from a pump through an opening provided in the gasket carrier and gasket to the central chamber portion of the valve. After reaching the central chamber portion of the valve, the fluid is directed downwardly by the distributor to another opening provided in the gasket and gasket carrier which is in communication with a preselected outlet passage. The selection of the latter passage is accomplished by rotating the handle to thereby cause the distributor to also be rotated. As the distributor rotates, it is lifted off the gasket. When the handle is in any one of the six operating positions, thereof other than the winterize position, the distributor compresses the gasket thereby to provide a seal between the various openings which are formed in the gasket carrier to prevent leakage therebetween of the fluid which is supplied to the central chamber portion of the valve.

10 Claims, 13 Drawing Figures

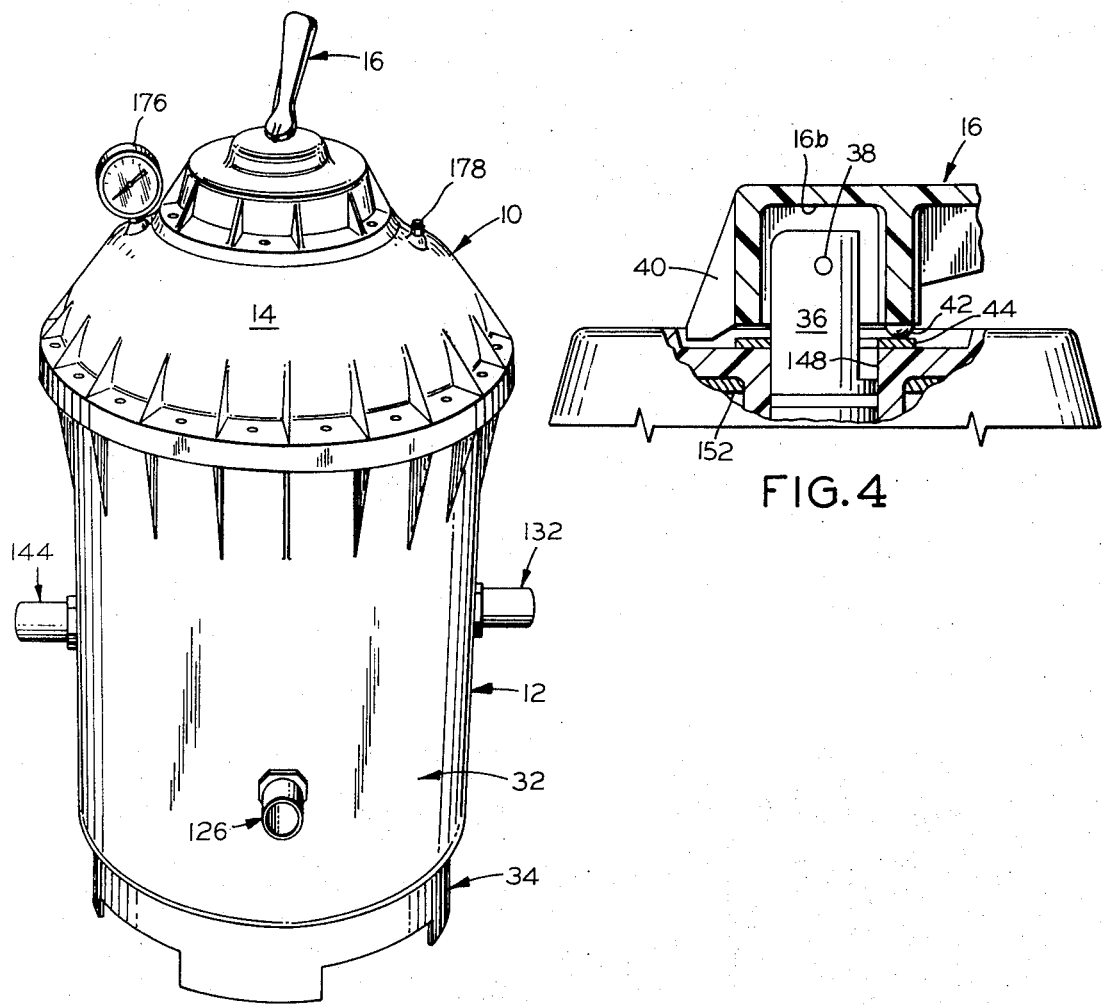
FIG. 4
FIG. 1
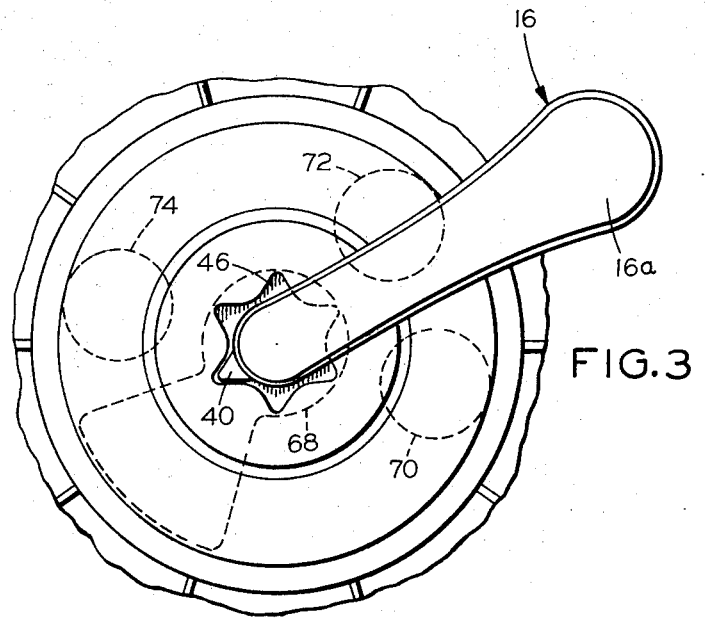
FIG. 3

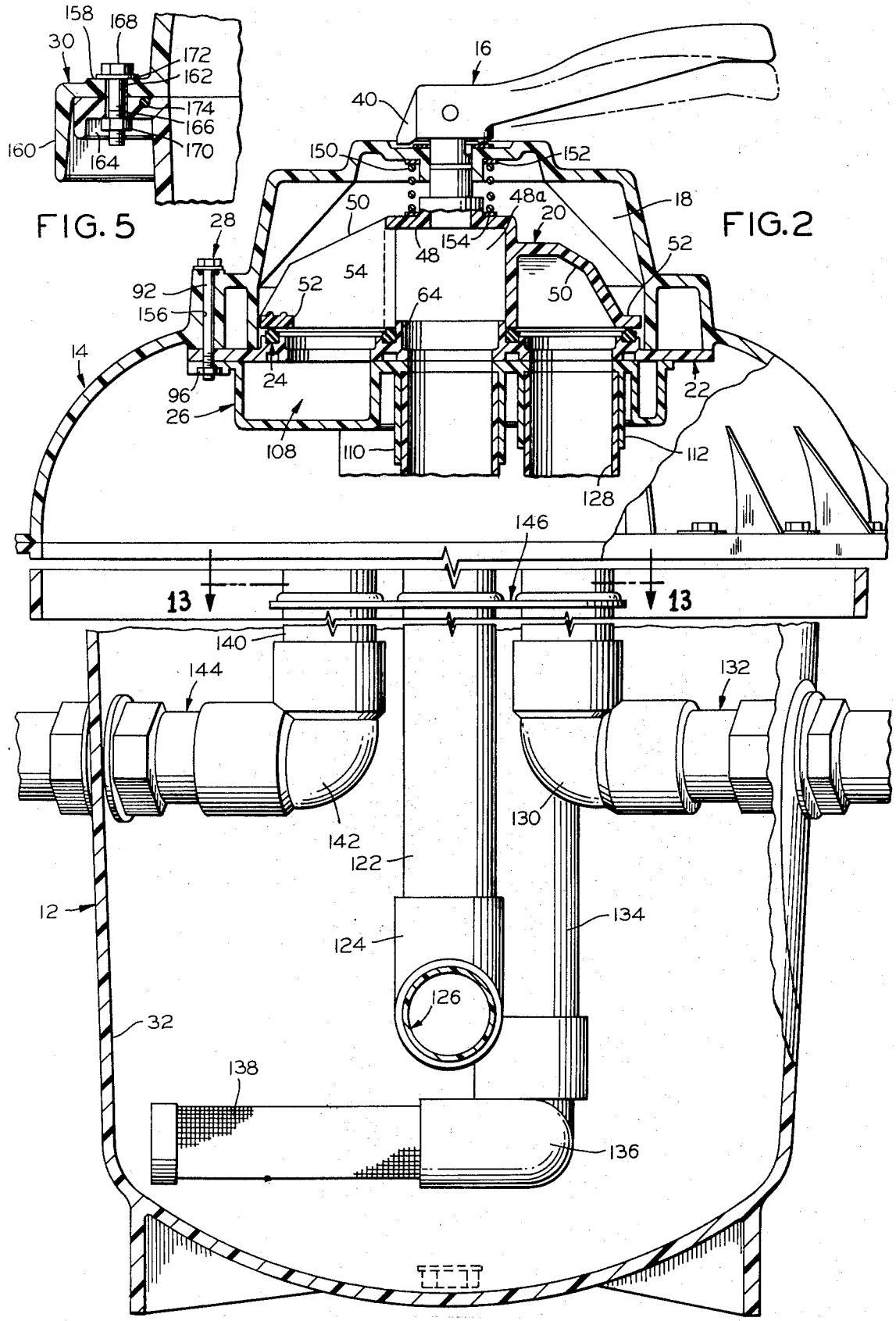

ROTARY SWIMMING POOL VALVE

BACKGROUND OF THE INVENTION

As is evident by reference to the prior art, it has been known heretofore to employ a rotary valve in the filtering system of a swimming pool. Moreover, it has been known previously to employ a multiport valve for purposes of enabling a plurality of fluid flow operations to be performed. In this regard, there are at least four basic types of flow operations which such a valve should have the capability of controlling. First, the valve must obviously be capable of providing a flow path whereby fluid supplied from a suitable pump passes through the valve and the filter tank unit and is fed therefrom to the swimming pool. Secondly, it is desirable that the valve be capable of providing a flow path through the valve and the filter tank unit, whereby after a period of use the filter may be purged by what is commonly known in the art as a backwash. Thirdly, the valve should be able to provide a flow path therethrough whereby fluid flowing through the valve may be discharged to waste. Finally, the valve must be operable so that the flow of fluid from the pump to the swimming pool bypasses the filter bed. This produces a lower pressure drop which greatly increases the flow and therefore the pump suction thereby establishing a condition used in vacuuming the swimming pool.

Although many different designs of rotary valves of the type intended for use in connection with swimming pools have been provided heretodate, these prior art forms of swimming pool valves have all generally proven to be unsatisfactory in some regard or another when placed in operation. For example, one undesirable feature which characterizes the construction of many prior art forms of rotary swimming pool valves is the fact that a substantial amount of piping of a relatively complex nature has been required in order to enable the necessary fluid connections to be made between the valve and the fluid tank unit, and to connect the filter tank unit in the filtering system of the swimming pool. Another undesirable feature of many prior art forms of rotary swimming pool valves is the fact that the majority of the piping which is employed to connect the valve to the filter tank unit is located high up on the filter cover. This gives a cluttered appearance and is a source of leakage due to the excessive flexing of the hoses. Consequently, in the event that leakage of any of the pipe connections takes place, the leaking fluid is uncontained and therefore is free to flow all over the surrounding area, whereas if the piping were located internally within one of the devices any leakage occurring from one of the pipe connections would be contained within the device. Moreover, having the piping located externally and close to the operating handle of the devices increases the possibility that the piping may be damaged as the result of accidental contact therewith, etc. On the other hand, with the piping positioned within one of the devices, the housing thereof affords at least some measure of protection thereto. Also, the connections between the devices and the swimming pool, pump, etc., are then effected at a low level, closer to the ground, reducing the susceptibility of damage thereto.

Accordingly, it is an object of the present invention to provide a novel and improved multiport rotary valve which is particularly adapted for use in connection with the filtering system of a swimming pool.

It is also an object of the present invention to provide such a multiport rotary valve which is operable to selectively provide one of a plurality of different flow paths through the valve whereby fluid supplied thereto by a pump may be made to flow through the valve to a filter tank unit and therefrom to a swimming pool, or may be made to flow through the valve to the filter tank unit in such a manner as to cause a backwash operation to be performed whereby to purge the filter, or may be made to flow through the valve so as to discharge to waste, or the valve may function to improve the vacuuming action of the pump.

It is another object of the present invention to provide such a multiport rotary valve which is directly mountable on a filter tank unit to provide an assembly which is connectable between a fluid supply source and the swimming pool to which the fluid is being supplied.

A further object of the present invention is to provide such a multiport rotary valve which is connectable to a filter tank unit to provide an assembly wherein the piping connections between the multiport rotary valve and the filter tank unit are located internally of the assembly.

A still further object of the present invention is to provide such a multiport rotary valve wherein the piping connections which are needed to be made for purposes of connecting the multiport rotary valve into the filtering system of a swimming pool are located close to the bottom of the assembly and therefore are not likely to be abused.

Another object of the present invention is to provide such a multiport rotary valve which is relatively inexpensive to manufacture, is easy to assemble, yet is reliable in operation and has a long operating life.

SUMMARY OF THE INVENTION

It has now been found that the foregoing and related objects can be readily obtained in a multiport rotary valve which is particularly adapted to be used as a part of a filtering system for a swimming pool. The multiport rotary valve includes an integrally formed, dome-shaped cover assembly having a central chamber portion formed therein. The components of the valve are supported within the cover assembly whereby the latter thereby comprises a housing therefor. These components include a spring biased distributor which is suitably mounted for rotation within the central chamber portion, a handle which is externally supported on the cover assembly and which is operatively connected to the distributor whereby rotation of the latter is accomplished by rotating the handle, a gasket carrier which supports a gasket, and an end plate in which there is formed an inlet pressure port as well as a plurality of outlet ports. The cover assembly includes means for detachably mounting the rotary valve onto a filter tank unit in such a manner that the piping connections therebetween are all located within the interior of the assembled valve and tank unit. With the valve and tank so assembled, input fluid is fed from a suitable pump upwardly through the input port. The input fluid then flows through an opening provided for this purpose in the gasket carrier and the gasket. Thereafter the fluid exits into the central chamber portion of the valve through an opening provided in the distributor. After reaching the central chamber portion of the valve, the fluid is directed downwardly by the distributor to another opening provided in the gasket and gasket carrier which is in communication with a preselected outlet passage. The selection of the latter passage is accomplished by rotating the external handle thereby to cause the distributor to also be rotated. As the distributor rotates, it is lifted off the gasket. When the handle is in any of the six operating positions thereof other than the winterize position, the distributor compresses the gasket thereby to provide a seal between the various openings which are found in the gasket carrier to prevent leakage therebetween of the fluid which is supplied to the central chamber portion of the valve.

In accordance with the preferred embodiment of the invention, the distributor is rotatable by the externally mounted handle to one of six selected positions. In one of these positions, the fluid being pumped to the valve may be made to flow through the valve to a filter tank unit and therefrom to a swimming pool. In another position, the fluid may be made to flow through the valve to the filter tank unit in such a manner as to cause a backwash operation to be performed whereby to purge the filter. When the distributor is rotated to a third position, the fluid may be made to flow through the valve so as to discharge to waste. When the distributor is placed in a fourth position, the valve is operable to recirculate the flow of fluid from the pump to the swimming pool. This latter condition is useful in vacuuming large debris from the swimming pool. The fifth position, called rinse, is used to settle the filtering bed after backwashing. The sixth position is used for winterizing and merely lifts the distributor off its seat to prevent accumulation of ice in any one of the cavities. For purposes of detachably mounting the valve to the filter tank unit, the multiport rotary valve in accord with the present invention preferably is provided along its circumference with a depending flange which is spaced by a shoulder portion from the body of the cover assembly. The width of the shoulder portion is selected so as to correspond to the dimensions of a flange which is provided along the rim of the filter tank unit whereby the valve is capable of being mounted to the tank unit with the shoulder portion of the former in engagement with the flange of the latter. The multiport rotary valve is secured in position on the filter tank unit through the use of suitable fastening means which pass through the shoulder portion of the valve and the flange of the tank unit.

BRIEF DESCRIPTION OF THE DRAWINGS

FIG. 1 is a perspective view of a multiport rotary valve constructed in accordance with the present invention illustrated detachably mounted on the filter tank unit;

FIG. 2 is a partial sectional view of the multiport rotary valve and filter tank unit of FIG. 1, illustrating the internal construction thereof in accordance with the present invention;

FIG. 3 is a plan view of a portion of a multiport rotary valve constructed in accordance with the present invention, illustrating the externally mounted handle thereof;

FIG. 4 is a side elevational view partially in section of a portion of the handle of a multiport rotary valve constructed in accordance with the present invention, illustrating the manner in which the handle is operatively connected to the multiport rotary valve;

FIG. 5 is a sectional view of a portion of the side wall of a multiport rotary valve constructed in accordance with the present invention and the side wall of a filter tank unit, illustrating the means by which the multiport rotary valve is secured in position on the filter tank unit;

DETAILED DESCRIPTION OF THE ILLUSTRATED EMBODIMENT

Figure 6:
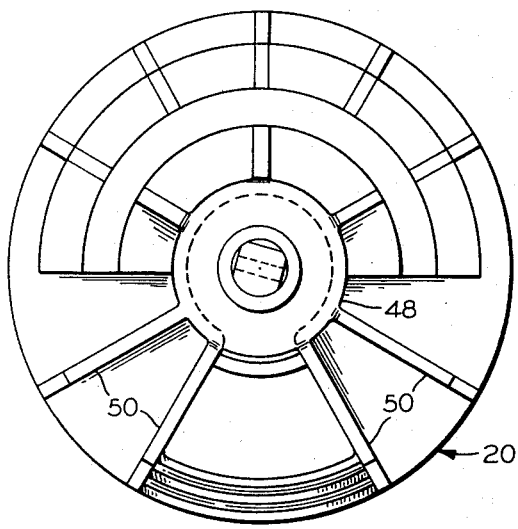
FIG. 6 is a plan view of the distributor of a multiport rotary valve constructed in accordance with the present invention.

Referring now to the drawings and more particularly FIGS. 1 and 2 thereof, there is illustrated therein a multiport rotary valve, generally designated by the reference numeral 10, which is shown mounted on a filter tank 12. The multiport rotary valve 10, as most clearly seen in FIG. 2 of the drawings, includes an integrally formed generally dome-shaped cover assembly 14 having a handle 16 mounted thereon, which is externally accessible. The cover assembly 14 has a central chamber portion 18 formed therein in which a fluid distributor 20, as will be described more fully subsequently, is mounted for rotation therewithin. The cover assembly 14 in addition, includes a gasket carrier 22 which functions as a support for a gasket 24, an end plate 26, and fastening means 28 for securing the gasket carrier 22 and the end plate 26 to the cover assembly 14. Also, the cover assembly 14 is provided with a mounting means 30 which is operable for purposes of mounting the multiport rotary valve 10 onto the filter tank unit 12, in a manner yet to be described.

As best shown in FIG. 2 of the drawings, the filter tank unit 12 comprises a generally cylindrically shaped tank 32 having a base 34 on which it is supported. The latter base 34 as illustrated in the drawings is formed integrally with the tank 32. However, it is to be understood that, if so desired, the tank 32 and the base 34 could also be formed as separate members which are subsequently secured together by means of any conventional form of fastening means.

Referring particularly to FIGS. 2, 3 and 4 of the drawings, the handle 16 as depicted therein comprises an elongated member having a portion 16a thereof which is configured so as to be capable of being readily grasped in one hand by an operator. At one end thereof, the handle 16 is provided with a hollow chamber portion 16b which receives therein a stub shaft 36 which is formed as a part of the distributor 20. The handle 16 is attached to the stub shaft 36 by suitable means such as by means of a pin 38 which passes through suitable openings (not shown) provided for this purpose in both the side walls of the portion 16b of the handle 16 and the stub shaft 36 whereby the handle 16 is capable of pivoting to a limited extent relative to the stub shaft 36. In addition, the handle 16, which in accordance with the preferred embodiment of the invention is made of a polycarbonate material, is provided as illustrated in the drawings at one end thereof with a pointer 40 which cooperates with a series of legends (not shown) provided on the external surface of the cover assembly 14 adjacent the path of rotation of the handle 16. The legends (not shown) in association with the pointer 40 provide a means of identifying the particular position that the distributor 20 is in and thereby which path of flow the fluid is following through the valve 10. The various paths of flow which the fluid can take through the valve 10 will be described hereinbelow. In order to prevent the handle 16 from being accidentally rotated, a hemispherically shaped button 42 is formed at one point along the circumference of the depending circular portion which defines the hollow chamber portion 16b. The button 42 cooperates with a washer 44 through which the stub shaft 36 projects and which is interposed between the handle 16 and the top of the cover assembly 14. The washer 44 is preferably formed of a wear resistant material and functions as a bearing surface. In this connection, in accordance with the mode of operation of the illustrated embodiment of the invention, the mode of operation of the multiport rotary valve 10 is such that in order to rotate the handle 16, the latter must first be pivoted about pivot pin 38 in a downwardly direction to the dotted line position thereof depicted in FIG. 2 of the drawings thereby causing the button 42 to bear against the bearing surface, i.e., washer 44. The top of the cover assembly 14 is provided further with a cut-out portion 46 configured in the shape of a star, the points of which are designed so as to correspond to the shape and dimension of the pointer 40 whereby at least a portion of the latter pointer 40 is receivable selectively within any one of the points of the star-shaped cut-out portion 46. When the handle 16 is pivoted downwardly, this causes the pointer 40 to be lifted free from the point of the cut-out portion 46 in which the pointer 40 had been positioned. The handle 16 can then be rotated until the distributor 20 has been rotated to the proper position whereby to establish a particular path of flow through the multiport rotary valve 10 and then the handle 16 can be returned to the solid line position thereof shown in FIG. 2 of the drawings wherein the pointer 40 is once again positioned in one of the points of the star-shaped cut-out portion 46. With the pointer 40 so positioned, the handle 16 is locked against any rotation stemming from the accidental engagement thereof by some person or object.

Figure 7:
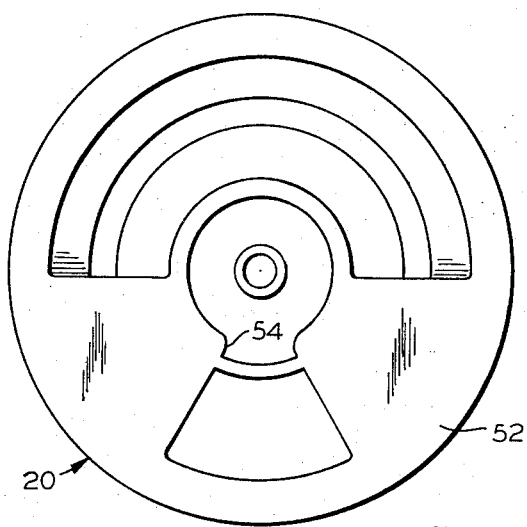
FIG. 7 is a bottom view of the distributor shown in FIG. 6 of a multiport rotary valve constructed in accordance with the present invention.

Turning now to a consideration of the distributor 20, the latter as best understood with reference to FIGS. 2, 6, and 7 of the drawings, is positioned within the central chamber portion 18 of the cover assembly 14, and is operatively connected in the manner described in the preceding paragraph whereby when the handle 16 is rotated, the distributor 20 will also be rotated. The distributor 20 is formed with a hub 48 having a hollow interior 48a provided for a purpose which will be described subsequently, and from which a plurality of ribs 50 extend radially outwardly into slightly spaced relation relative to the inner side walls of the central chamber portion 18. The ends of the ribs 50 are interconnected by means of a bottom plate-like portion 52 which, in accordance with the preferred embodiment of the invention, is integrally formed as a part of the distributor 20. One of the walls of the hub 48 is provided with an opening 54 which functions to provide a through passage from the hollow interior 48a of the hub 48 to the exterior of the distributor 20.

Figure 8:
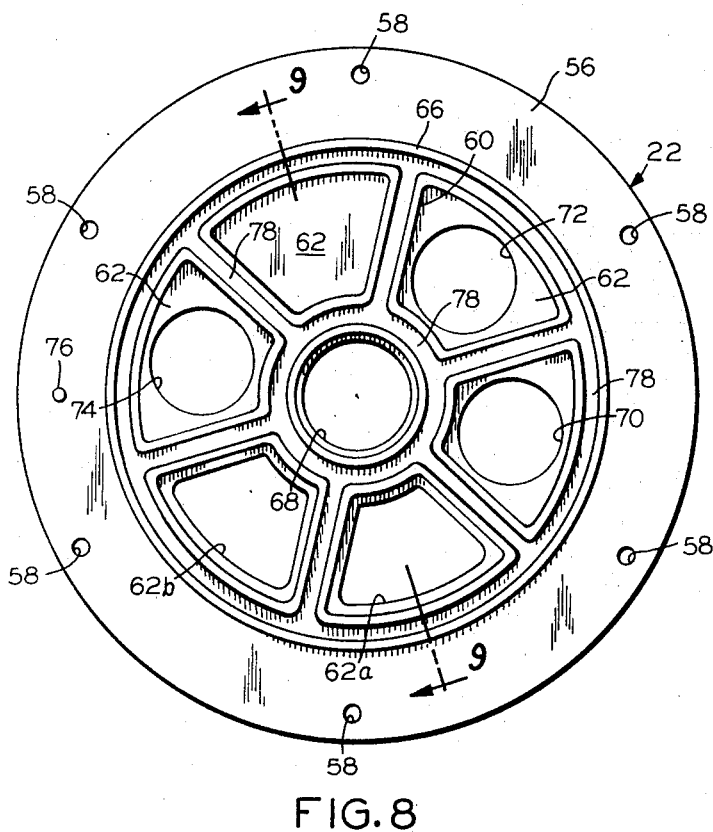
FIG. 8 is a plan view of a gasket carrier of a multiport rotary valve constructed in accordance with the present invention.
Figure 9:
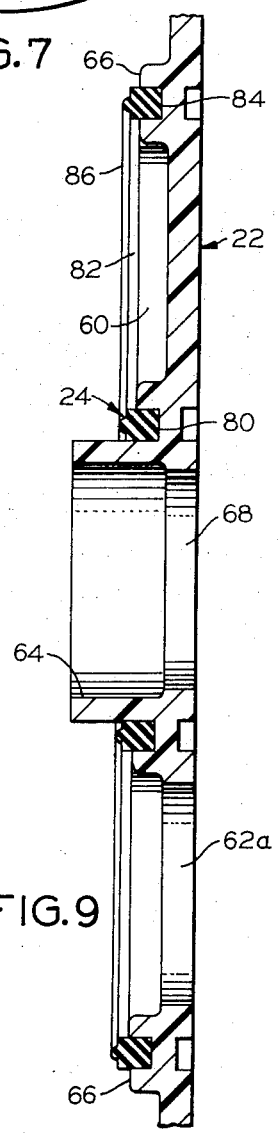
FIG. 9 is a cross-sectional view of the gasket carrier of FIG. 8 taken generally along the line 9—9 in FIG. 8.

The gasket carrier 22 and the end plate 26, as most clearly seen in FIG. 2 of the drawings, are mounted in the cover assembly 14 so that they are positioned in abutting engagement at the mouth of the central chamber portion 18 whereby to substantially close off entrance thereto. With regard to the construction of the gasket carrier 22, the latter as shown in FIGS. 8 and 9 of the drawings is substantially circular in configuration. More specifically, the gasket carrier 22 is provided with a circular flange 56 in which there are provided a plurality of suitably located openings 58. The latter openings 58 are provided for purposes of receiving therein the fastening means 28 to which further reference will be made subsequently. In addition, the gasket carrier 22 is provided with a plurality of radially extending ribs 60 which are arranged relative to each other whereby to divide the gasket carrier 22 into a plurality of pie-shaped sections 62. At their inner ends, the ribs 58 are interconnected by means of a circular rib 64 at least a portion of which projects outwardly from the gasket carrier 22 to a greater extent than do the ribs 58. The external diameter of the circular rib 64 is slightly smaller than the internal diameter of the hollow interior 48a of the hub 48 provided in the distributor 20 whereby as will be described more fully hereinafter, the gasket carrier 22 is capable of being mounted in abutting engagement with the bottom portion 52 of the distributor 20 such that the circular rib 64 is received in the aforementioned hollow interior 48a of the hub 48. At their outer ends, the ribs 58 are interconnected by means of a circular rib 66. In accordance with the illustrated embodiment of the invention, the radially extending ribs 58 are formed integrally with the circular ribs 64 and 66.

As depicted in FIG. 8 of the drawings, a plurality of circular openings 68, 70, 72 and 74 are formed in the gasket carrier 22. Opening 68 is provided in the center of the gasket carrier 22, i.e., the portion of the latter which is encompassed within the circular rib 64. The remaining three circular openings 70, 72 and 74 are formed in three of the six sections 62 into which the gasket carrier 22 is divided by the radially extending ribs 58. As will be described more fully hereinafter, the opening 68 comprises an inlet port to the central chamber portion 18, and the other three openings, i.e., openings 70, 72 and 74 comprise outlet ports therefrom. Two of the remaining pie-shaped sections, i.e., sections 62a and 62b are also provided with openings which correspond in shape to the internal dimensions and configuration of the sections 62a and 62b. Preferably, the gasket carrier 22 is provided with a locating pin 76 which is intended to be employed for purposes of aligning the gasket carrier 22 relative to the distributor 20 in the mouth of the central chamber portion 18 whereby to insure that these members are properly aligned relative to each other.

The ribs 58, 64 and 66 of the gasket carrier 22, as best understood with reference to FIG. 8 of the drawings, each have a groove 78 formed at the center thereof into which the gasket 24 is capable of being inserted with a frictional fit. The gasket 24 has the same shape as that portion of the gasket carrier 22 which is formed by the ribs 58 and the interconnections therewith of the circular ribs 64 and 66. More specifically, in configuration the gasket 24 resembles a wheel having a hollow hub 80, a plurality of spokes 82 extending radially outwardly from the hub 80, and an outer circular portion 84 which serves to interconnect the outer ends of all of the spokes 82. The spaces lying between the spokes 82, and the hub 80 and circular portion 84 comprise open areas. As seen with reference to FIGS. 2 and 9 of the drawings, the gasket 24 is basically rectangular in cross-section, but has a raised lip 86 formed integrally therewith approximately at the center of the external surfaces of the hub 80, spokes 82, and circular portion 84. Moreover, it will be noted with particular reference to FIG. 9 of the drawings, that the height of the gasket 24 exceeds the depth of the grooves 78 formed in the gasket carrier 22 such that when the gasket 24 is received in the grooves 78, a portion of the gasket 24 including the raised lip 86 thereof projects outwardly of the grooves 78. Consequently, in a manner yet to be described, the raised lip 86 of the gasket 24 is capable of bearing against the bottom of the plate-like portion 52 of the disbributor 20 as illustrated in FIG. 2 of the drawings.

Figure 10:
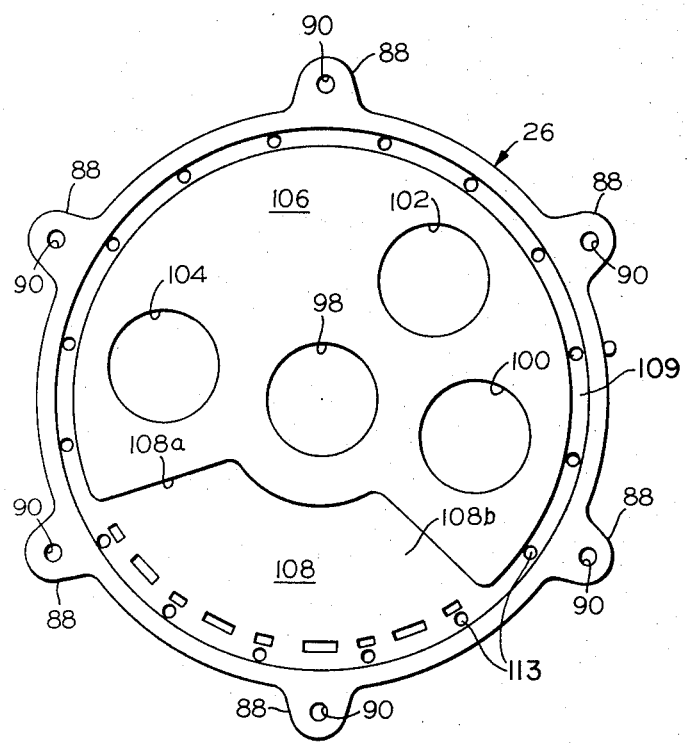
FIG. 10 is a plan view of the end plate of a multiport rotary valve constructed in accordance with the present invention.
Figure 12:
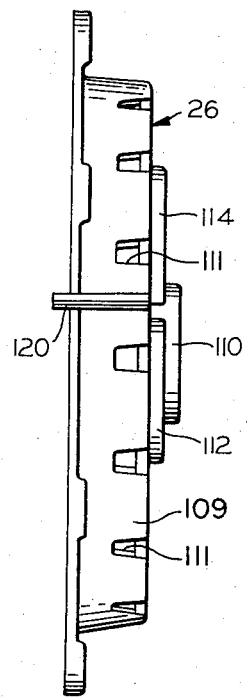
FIG. 12 is a side elevational view of the end plate shown in FIGS. 10 and 11, of a multiport rotary valve constructed in accordance with the present invention.
Figure 11:
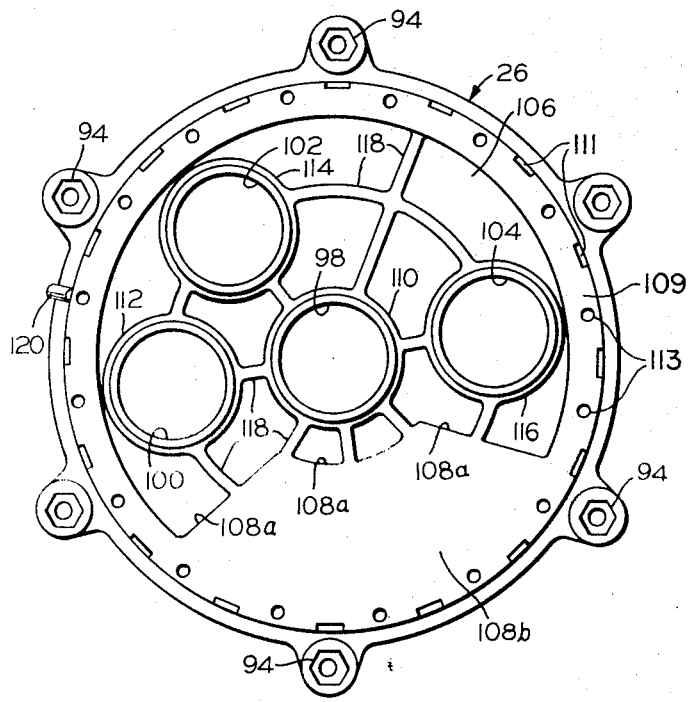
FIG. 11 is a bottom view of the end plate shown in FIG. 10 of a multiport rotary valve constructed in accordance with the present invention.

Turning now to a consideration of the construction of the end plate 26, the nature of the structure thereof is best understood with reference to FIGS. 2, 10, 11 and 12. Referring first to FIG. 2 of the drawings, as shown therein the end plate 26 is mounted by means of fastening means 28 at the mouth of the central chamber portion 18 in such a manner as to be in contact with the bottom surface of the circular flange 56 of the gasket carrier 22. For this purpose, as illustrated in FIGS. 10 – 12 of the drawings, the end plate 26 is provided with a plurality of bosses 88, each having a suitable opening 90 formed completely therethrough for purposes of receiving therein the fastener 92 of the fastening means 28. Moreover, in accord with the preferred embodiment of the invention, the undersurface of each of the bosses 88 surrounding the opening 90 thereof is cut away in a generally hexagonal configuration 94 whereby to be capable of receiving therein the hexagonally shaped nut 96 of the fastening means 28 so that when the fastener 92 is being secured in the nut 96 the latter will not turn relative to the boss 88. With regard to its configuration, the end plate 26 is generally circular in shape, and has four circular openings 98, 100, 102 and 104 formed completely therethrough. The diameters of the circular openings 98, 100, 102 and 104 are the same as the diameters of the circular openings 68, 70, 72 and 74 provided in the gasket carrier 22. Furthermore, the spacing between the circular openings 98, 100, 102 and 104 corresponds to that which exists between openings 68, 70, 72 and 74 whereby when the end plate 26 is mounted in abutting relation to the gasket carrier 22 as illustrated in FIG. 2 of the drawings, the openings 98, 100, 102 and 104 are aligned with the openings 68, 70, 72 and 74, respectively. As most clearly depicted in FIG. 2 of the drawings, the surface 106 surrounding the openings 98, 100, 102 and 104 is generally planar except for a section thereof which is cut away to form a pocket-like portion 108, i.e., a portion which is bounded by a plurality of side walls 108a, a closed bottom wall 108b, and an open top wall. In addition an upwardly opening channel portion 109 extends from the pocket-like portion 108 about the remainder of the periphery spaced outwardly from the openings 98, 100, 102, 104. Spaced about the outer sidewall of the channel portion 109 and of the pocket-like portion 108 are a multiplicity of apertures 111 therethrough and a multiplicity of apertures 113 are also provided in the bottom wall 108b of the pocket-like portion 108 and the bottom wall of the channel portion 109 adjacent the outer periphery thereof. When mounted in the manner illustrated in FIG. 2, the end plate 26 and the gasket carrier 22 are aligned so that the pocket-like portion 108 of the end plate 26 underlies the pie-shaped sections 62a and 62b of the gasket carrier 22.

Referring again to FIGS. 11 and 12 of the drawings, it can be seen therefrom that the openings 98, 100, 102 and 104 comprise the open ends of a plurality of tubular sleeve-like members 110, 112, 114 and 116, respectively, which are operable for a purpose which will be described subsequently. The lengths of the tubular sleeve-like members 110, 112, 114 and 116 are such that the latter members extend beyond the lower surface of the end plate 26. Preferably, the tubular sleeve-like members 110, 112, 114 and 116 are interconnected to each other and to the side walls 108a of the pocket-like portion 108 in a generally web-like arrangement by means of a plurality of support members 118. The latter support members 118 provide the end plate 26 with additional rigidity as well as function to insure that the proper spacing is maintained between the tubular sleeve-like members 110, 112, 114 and 116 and the pocket-like portion 108. Also, as depicted in FIGS. 10 – 12 of the drawings, the end plate 26 may, if so desired, be provided with a locating pin 120 employable for the purpose of insuring that the end plate 26 is properly aligned relative to the gasket carrier 22 when these members are mounted in the mouth of the central chamber portion 18.

With reference now to the filter tank unit 12, the latter as has been set forth previously hereinabove includes a cylindrical tank 32 and a base 34 which supports the tank 32 and is formed integrally therewith. In accord with conventional practice, some form of filtering material such as for example sand is generally provided in tank 32. However, in the interest of clarity of illustration, the aforereferenced filtering material has not been depicted in FIG. 2 of the drawings. Referring further to FIG. 2, as shown therein a plurality of pipes are supported within the filter tank unit 12. More particularly, a vertically extending pipe 122, as viewed with reference to FIG. 2, has one end thereof positioned in the tubular sleeve-like member 110 of end plate 26 and the other end received in an elbow 124. The other end of the elbow 124 is connected to pipe means 126 which extends from the elbow 124 to the exterior of filter tank unit 12 through a suitable opening (not shown) provided for this purpose in the side wall of tank 32. The externally accessible end of pipe means 126 is connectable by suitable piping (not shown) to a pump (not shown) operable for purposes of supplying fluid from a suitable source thereof (not shown) to the filter tank unit 12, and therefrom through pipe means 126, elbow 124 and pipe 122 to the multiport rotary valve 10 in a manner which will be described below. Pipe 128 as seen in FIG. 2 of the drawings, has one end thereof positioned in tubular sleeve-like member 112 and the other end thereof received in elbow 130. The other end of elbow 130 is connected to pipe means 132. The pipe means 132 in turn extends between the elbow 130 and the exterior of the filter tank unit 12 through a suitable opening (not shown) provided for this purpose in the side wall of the tank 32. Pipe means 132 provides an externally accessible means for connecting the filter tank unit 12 through suitable piping (not shown) to the inlet (not shown) of a swimming pool. A third vertically extending pipe 134 is also provided within the tank 32. The latter pipe 134 has one end thereof (not shown) provided in the tubular sleeve-like member 114 and the other end received in the elbow 136. The other end of the elbow 136 is connected to an underdrain 138 which comprises several short lengths of a tubular member having perforated side walls whereby fluid may flow therethrough. The latter underdrain 138 as illustrated in FIG. 2 of the drawings is positioned entirely within the interior of the tank 32. Finally, the tank 32 also has supported therein a fourth vertically extending pipe 140 which has one end thereof (not shown) positioned in the tubular sleeve-like member 116 and the other end received in the elbow 142. Pipe means 144 connects the other end of the elbow 142 to the exterior of the filter tank unit 12. More specifically, the pipe means 144 passes through a suitable opening (not shown) provided for this purpose in the side wall of the tank 32. The externally accessible end of pipe means 144 is adapted to be connected by suitable piping (not shown) to a waste discharge means (not shown), i.e., a means capable of receiving fluid waste from the multiport rotary valve 10 which it is desired be no longer cycled through the valve 10 to the swimming pool (not shown).

Figure 13:
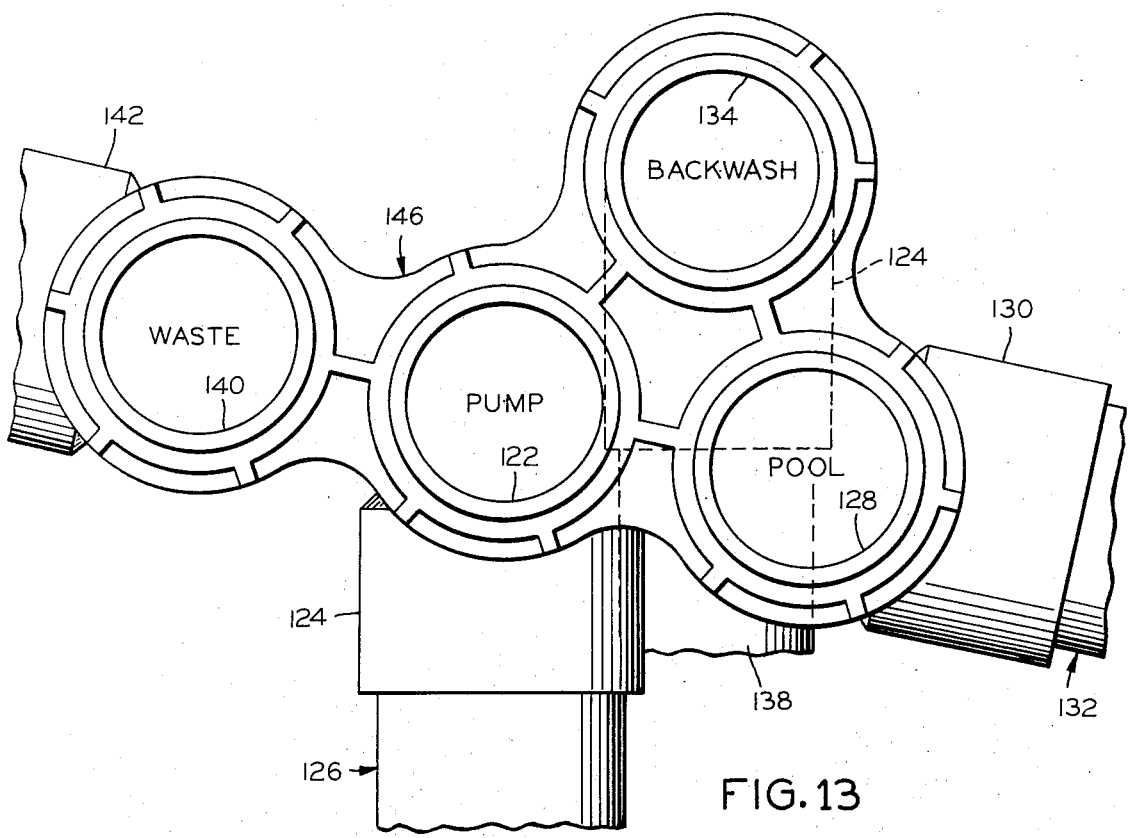
FIG. 13 is a cross-sectional view of the piping interconnecting the multiport rotary valve and filter tank in accordance with the present invention taken generally along the line 13—13 in FIG. 2.

As best illustrated in FIG. 13 of the drawings, in accordance with the preferred embodiment of the invention, the ends of the vertically extending piping 122, 128, 134 and 140 which are positioned in the tubular sleeve-like members 110, 112, 114 and 116, respectively, preferably first pass through openings provided therefor in a support bracket 146 before being received in the members 110, 112, 114 and 116. The latter bracket 146 accomplishes the dual functions of providing support for the pipes 122, 128, 134 and 140 as well as that of maintaining the proper spacing therebetween to insure that they are properly aligned relative to the tubular sleeve-like members 110, 112, 114 and 116.

A description of the method of assembly of the components embodied in the multiport rotary valve 10 as well as the manner in which the multiport rotary valve 10 is mounted on the filter tank unit 12 will now be set forth. In assembling the valve components within the cover assembly 14, the stub shaft 36 of the distributor 20 is inserted through an opening 148 provided for this purpose in the top of the cover assembly 14. In accord with the preferred embodiment of the invention, a spring 150 surrounds the stub shaft 36 and is interposed between the inner surface of the top of the cover assembly 14 and the top surface of the hub 48 of the distributor 20 whereby the distributor 20 is biased in a downwardly direction, as viewed with reference to FIG. 2 of the drawings, for a purpose which will be set forth more fully hereinafter. The opposite ends of the spring 150 as seen in FIG. 2 preferably bear against a pair of bearing surfaces 152 and 154 located in juxtaposed relation to the inner surface of the top of the cover assembly 14 and the top external surface of the hub 48, respectively. Handle 16 is attached to the stub shaft 36 by means of the pin 38 whereby to maintain the distributor 20 mounted in the aforedescribed manner. The gasket carrier 22 with the gasket 24 prepositioned thereon, and the end plate 26 are next assembled in the cover assembly 14. As depicted in FIG. 2 of the drawings, the basket carrier 22 is positioned adjacent to the mouth of the central chamber portion 18 with the circular rib 64 of the gasket carrier 22 extending into the hollow interior 48a of the hub 48 of the distributor 20 and with the circular flange 56 of the gasket carrier 22 in abutting relation with the inner wall of the cover assembly 14. Thereafter, the end plate 26 is also positioned adjacent to the mouth of the central chamber portion 18 in such a manner that the surface 106 of the end plate 26 is in engagement with the undersurface of the gasket carrier 22, and so that the openings 98, 100, 102 and 104 provided in the end plate 26 are aligned with the openings 68, 70, 72 and 74, respectively, formed in the gasket carrier 22 and with the pocket-like portion 108 of the end plate 26 positioned so as to underlie the pie-shaped sections 62a and 62b of the gasket carrier 22. The gasket carrier 22 and end plate 26 are then secured in place by passing the fasteners 92 of fastening means 28 through openings 56 provided for this purpose in the cover assembly 14, and then through the openings 58 and 90 of gasket carrier 22 and end plate 26, respectively. Nuts 96 are threaded onto the fasteners 92 and tightened thereon whereby to securely mount the distributor 20, gasket carrier 22 and end plate 26 within the cover assembly 14 of the multiport rotary valve 10.

The multiport rotary valve 10 is adapted to be mounted directly onto the filter tank unit 12 whereby to provide an integral unit wherein the valve 10 forms a cover for the tank unit 12. For purposes of mounting the valve 10 to the tank unit 12, the cover assembly 14 is provided with a mounting means 30 which extends around the circumference of the open end of the cover assembly 14. Mounting means 30 includes an outwardly extending shoulder 158 which in accord with the illustrated embodiment of the invention is formed integrally with the cover assembly 14. A flange 160 depending from the shoulder 158 as most clearly seen in FIG. 2 of the drawings in integrally formed at the outer end of the shoulder 158. A plurality of openings 162 is provided in the shoulder 158 at suitably spaced locations around the circumference of the cover assembly 14 for purposes of receiving therein suitable fastening means as will be referred to more particularly hereinafter. The shoulder 158 is dimensioned so as to correspond to the width of a rim 164 which is integrally formed at the open end of the tank 32. In mounting the multiport rotary valve 10 on the filter tank unit 12, the valve 10 is positioned relative to the tank unit 12 such that the shoulder 158 rests in abutting relation on the rim 164 of the tank unit 12, and so that the openings 166 provided in the rim 164 are aligned with the openings 162 provided in the shoulder 158. As the valve 10 is being positioned in the aforedescribed manner relative to the filter tank unit 12, the ends of pipes 122, 128, 134 and 140 are received with a sliding fit in the tubular sleeve-like members 110, 112, 114 and 116. Thereafter the valve 10 is secured in position on the filter tank unit 12 by means of a plurality of fasteners 168 which are received in the openings 162 and 166 provided therefor in the shoulder 158 and the rim 164, respectively. Nuts 170 are thereafter threaded onto the fasteners 168 and tightened thereon. In accord with the illustrated embodiment of the invention, a washer 172 is preferably interposed between the head of the fastener 168 and the upper surface of the shoulder 158. In order to prevent leakage between the shoulder 158 and the rim 164 of fluid from the interior of cover assembly 14, a conventional O-ring type gasket 174 suitably supported in an opening (not shown) provided therefor in the rim 164 is preferably employed between the shoulder 158 and the rim 164.

The complete the description of the cover assembly 14, as shown in FIG. 1 of the drawings, a conventional pressure gauge 176 is preferably suitably mounted on the exterior of the cover assembly 14. In addition, in accord with the preferred embodiment of the invention, the cover assembly 14 also has an air vent 178 preferably provided thereon in spaced relation to the gauge 176.

Considering now the mode of operation of the multiport rotary valve 10 constructed in accordance with the present invention, with the valve 10 mounted on the filter tank unit 12 in the manner illustrated in FIGS. 1 and 2 of the drawings with the ends of pipes 122, 128, 134 and 140 received in the tubular sleeve-like members 110, 112, 114 and 116, respectively, input fluid is fed to pipe means 126 upwardly through elbow 124 and pipe 122. The fluid then flows through the opening 98 in end plate 26 and the opening 68 in gasket carrier 22. From the opening 68 the fluid passes into the hollow interior 48a of hub 48 of the distributor 20. Thereafter, fluid exits into the central chamber portion 18 of the valve 10 through the opening 54 provided in the distributor 20. After reaching the central chamber portion 18 of the valve 10, the fluid is directed downwardly by the distributor 20 to another opening provided in the gasket carrier 22 such as the opening 70, 72 or 74, the latter being in communication with the openings 100, 102 and 104, respectively, in the end plate 26, or to the openings 111 and 113 spaced about the periphery of the end plate in the pocket-like portion 108 and channel portion 109. Depending on which of the openings 100, 102 or 104 in the end plate 26 the fluid is directed to, the fluid will flow into either pipe 128 and therefrom through elbow 130 and pipe means 132 to the swimming pool, or pipe 134 and therefrom through elbow 136 and underdrain 138 to the interior of the tank 32, or pipe 140 and therefrom through elbow 142 and pipe means 144 to waste. In the filter position, the water entering through the pipe 122 and exiting into the central chamber 18 flows about the periphery of the end plate 26 and is discharged onto the top of the filter bed provided in the tank unit 12 through the multiplicity of apertures 111 and 113. The water thence flows downwardly through the filter bed and enters the underdrain 138 and passes back upwardly into the distributor through the pipe 134. It crosses over within the distributor and is directed downwardly through the pipe 128 and is discharged to the swimming pool.

In the backwash position, the water entering the distributor through the pipe 122 is directed by the distributor into pipe 134. This backwash water then exits into the bottom of the filter bed through the underdrain 138 and passes upwardly through the bed. It then enters into the pocket-like portion 108 and channel portion 109 of the distributor through the apertures 111, 113 and crosses over from the pocket-like portion 108 to the opening 104 for discharge through the pipe 140 to waste.

Similarly in the bypass position, the water entering the distributor through the pipe 122 crosses over by action of the distributor into the pipe 128 for discharge directly to the swimming pool. The selection of which of these paths of flow the fluid will take is determined by the position to which the handle 16 is rotated, i.e., the position to which the distributor 20 is rotated when the handle 16 is rotated since the latter is operatively connected to the distributor 20. As the distributor 20 rotates, the bottom portion 52 is lifted up out of engagement with the gasket 24. Thereafter, when the handle 16 is positioned in any one of the six operating positions thereof other than the winterize position, the bottom portion 52 of the distributor 20 acts upon the gasket 24 compressing the latter, which is formed of any suitable resilient material which is not readily susceptible to deterioration when employed in a fluid flow environment, whereby to provide a seal between the various openings 68, 70, 72 and 74 in the gasket carrier 22 thereby to prevent leakage therebetween of the fluid which is supplied to the central chamber portion 18 of the valve 10. By selectively positioning the distributor 20 relative to the openings 68, 70, 72 and 74 provided in the gasket carrier 22 through rotation of the handle 16 to a position vis-a-vis the appropriate legend (not shown) placed on the top of the cover assembly 14 adjoining the path of rotation of the handle 16, is is possible to provide different paths of flow of fluid through the multiport rotary valve 10 and the filter tank unit 12 whereby the valve 10 is operable to filter the fluid being supplied to the valve 10 by a pump from a suitable source thereof before it is fed to the swimming pool, or to perform a backwash operation whereby to purge the filter, or to discharge fluid from the valve 10 to waste, or when the valve 10 is in its recirculate condition to bypass the flow of fluid being pumped from a source thereof to the swimming pool.

Although only one embodiment of a multiport rotary valve constructed in accordance with the present invention has been shown in the drawings and described hereinabove, it is to be understood that modifications in the construction thereof may be made thereto by those skilled in the art without departing from the essence of the invention. In this connection, some of the modifications which can be made in the multiport rotary valve 10 have been alluded to hereinabove while others will become readily apparent to those skilled in the art when exposed to the present description and illustration of the construction of the multiport rotary valve 10. In this regard, although in accord with the preferred embodiment of the invention the cover assembly 14 and the other components of the valve 10 are preferably made of plastic as well as the filter tank unit 12, it is to be understood that these parts could also be made of other materials, suitable for this use, without departing from the essence of the invention. Furthermore, the number of different types of flow paths from the fluid through the multiport rotary valve 10 could be increased or decreased or the arrangement of the piping in the filter tank unit 12 could be changed, if so desired, while still embodying in the resulting construction the essence of the present invention.

Thus, it can be seen that the present invention provides a novel and improved multiport rotary valve which is particularly adapted for use in connection with the filtering system of a swimming pool. Moreover, the multiport rotary valve of the present invention is operable to selectively provide one of a plurality of different flow paths through the valve whereby fluid supplied thereto by a pump may be made to flow through the valve to a filter tank unit and therefrom to a swimming pool, or may be made to flow through the valve to the filter tank unit in such a manner as to cause a backwash operation to be performed whereby to purge the filter, or may be made to flow through the valve so as to discharge to waste, or the valve may function to bypass the flow of fluid therethrough when the valve is moved to the recirculate position. Furthermore, in accord with the present invention a multiport rotary valve has been provided which is directly mountable on a filter tank unit to provide an assembly which is connectable between a fluid supply source and a swimming pool to which the fluid is being supplied. The multiport rotary valve of the present invention is connectable to a filter tank unit to provide an assembly wherein the piping connections between the multiport rotary valve and the filter tank unit are located internally of the assembly. In addition, the multiport rotary valve in accord with the present invention minimizes the possibility that damage will be done to the piping connections which are utilized for purposes of connecting the multiport rotary valve into he filter system of a swimming pool. Finally, in accordance with the present invention, a multiport rotary valve has been provided which is relatively inexpensive to manufacture, is easy to assemble, yet is reliable in operation and has a long operating life.

Having thus described the invention I claim:

1. In a filtering system of a swimming pool including a filter tank and a plurality of pipes positioned within the filter tank and operable to provide different paths of fluid flow through the filtering system, the combination therewith of a unitary multiport rotary valve and cover, said multiport rotary valve and cover comprising:
   a. a cover member providing a hollow central chamber portion;
   b. a fluid flow distributor mounted in said central chamber portion for rotational movement therein relative to said cover member;
   c. an externally accessible handle on said cover rotatable between a plurality of different positions and operatively connected to said fluid flow distributor whereby said fluid flow distributor is also rotated between a plurality of different positions when said handle is rotated;
   d. gasket means underlying said distributor and having an inlet passage and a plurality of outlet passages therein;
   e. an end plate underlying said gasket means and having an inlet passage and a plurality of outlet passages therein, some of said outlet passages corresponding to the outlet passages of said gasket means, said distributor being dimensioned and configured to provide flow between various of said inlet and outlet passages of said end plate depending upon the rotated position thereof;
   f. fastening means securing said gasket means and said end plate within said cover member with said end plate enclosing the bottom of said hollow central chamer portion of said member whereby said gasket means and fluid flow distributor are disposed within said hollow central chamber portion and said gasket means is in abutting engagement with said fluid flow distributor and said end plate is in abutting engagement with said gasket means and said inlet passage and said plurality of outlet passages of said gasket means are aligned with said inlet passage and said plurality of outlet passages of said end plate; and
   g. mounting means provided on said cover member mounting said multiport rotary valve and cover directly onto the filter tank to form an integral unit therewith and with said member comprising the cover of the filter tank and said inlet passage and said plurality of outlet passages of said end plate connected in fluid flow relation with the plurality of pipes positioned in said filter tank whereby the piping connections between said multiport rotary valve and cover and said filter tank are made internally of the integral unit formed by said multiport rotary vlave and cover and said filter tank and whereby different paths of fluid flow through the filtering system are capable of being provided by selectively rotating said handle between said plurality of different positions thereof.

2. In a filtering system, the improvement of a multiport rotary valve and cover as set forth in claim 1 wherein said gasket means includes a gasket carrier and a gasket supported on said gasket carrier whereby said gasket when in engagement with the bottom surface of said fluid flow distributor is compressed thereby providing a seal between said inlet passage and said plurality of outlet passages of said gasket means thereby to prevent leakage of fluid therebetween.

3. In a filtering system, the improvement of a multiport rotary valve and cover as set forth in claim 1 wherein said inlet passage and said plurality of outlet passages of said end plate are each defined by a tubular sleeve member integrally formed in said end plate and wherein each of said tubular sleeve members receives therein one end of a corresponding one of the plurality of the pipes positioned in the filter tank.

4. In a filtering system, the improvement of a multiport rotary valve and cover as set forth in claim 1 wherein said cover, said gasket means and said end plate each have a plurality of openings formed therein, and said fastening means comprises a plurality of fasteners positioned in said plurality of openings in said cover, said gasket means and said end plate, and a plurality of nuts threaded onto said plurality of fasteners and tightened thereon.

5. In a filtering system, the improvement of a multiport rotary valve and cover as set forth in claim 1 wherein said mounting means includes a laterally outwardly extending shoulder on said cover member about the open end thereof and a depending flange formed at the outer edge of said shoulder, said shoulder corresponding in width to the rim at the mouth of the filter tank and said shoulder having a plurality of openings formed therein and receiving a plurality of securing means for securing said multiport rotary valve and cover in place on said filter tank.

6. In a filtering system, the improvement of a multiport rotary valve and cover as set forth in claim 1 wherein said plurality of outlet passages formed in said gasket means correspond in number to said plurality of outlet passages formed in said end plate which are connected to said pipes.

7. A unitary multiport rotary valve and cover, particularly adapted for use in connection with the filtering system of a swimming pool and for mounting upon the open mouth of a filter tank, comprising:
   a. an integral housing having an open end and a hollow central chamber portion spaced inwardly therefrom;
   b. a fluid flow distributor mounted in said central chamber portion for rotation therein relative to said housing and including a hub having a hollow interior and an opening provided in one of the side walls of said hub;
   c. an externally accessible handle on said housing rotatable between a plurality of different positions and operatively connected to said fluid flow distributor whereby said fluid flow distributor is also rotated between a plurality of different positions when said handle is rotated;
   d. gasket means underlying said distributor and comprising a gasket carrier and a gasket supported on said gasket carrier, said gasket carrier and said gasket each having an inlet passage and a plurality of outlet passages formed therein;
   e. an end plate underlying said gasket means and having an inlet passage and a plurality of outlet passages therein each defined by a tubular sleeve member formed in said end plate and operable to receive therein one end of a pipe means for making piping connections between the filter tank and the multiport rotary valve, some of said outlet passages corresponding to the outlet passages of said gasket means, said distributor being dimensioned and configured to provide flow between various of said inlet and outlet passages of said end plate depending upon the rotated position thereof;
   f. fastening means securing said gasket means and said end plate within said housing with said end plate enclosing the bottom of said hollow central chamber portion of said housing, then said gasket means and fluid flow distributor are disposed within said hollow central chamber portion and said gasket means being in engagement with the bottom surface of said fluid flow distributor and said end plate being in engagement with the bottom surface of said gasket carrier, said inlet passage and said plurality of outlet passages of said gasket means and said inlet passage and some of said plurality of outlet passages of said end plate being aligned whereby a path of fluid flow is established through said inlet passage of said end plate and said gasket means upwardly into said hollow interior of said hub of said fluid flow distributor and therefrom through said opening provided in the side wall of said hub and thence downwardly through one of said plurality of outlet passages in said gasket means and one of said plurality of outlet passages in said end plate, said one of said plurality of outlet passages in each of the said gasket means and said end plate being selectively determined by rotation of said handle between said plurality of different positions thereof; and
   g. mounting means on said housing about the periphery of the opening thereof for mounting said multiport rotary valve and cover directly onto a filter tank to form an integral unit therewith said piping connections between the filter tank and the multiport rotary valve being made internally of said integral unit.

8. The multiport rotary valve and cover as set forth in claim 7 wherein said mounting means about the periphery of said housing includes a laterally outwardly extending shoulder on said housing about the open end thereof and a depending flange formed at the outer edge of said shoulder to fit about the periphery of the tank upon which it is to be mounted.

9. The multiport rotary valve as set forth in claim 7 wherein said housing, said gasket means and said end plate each have a plurality of openings formed therein, and said fastening means comprises a plurality of fasteners positioned in said plurality of openings in said housing, said gasket means and said end plate, and a plurality of nuts threaded onto said plurality of fasteners and tightened thereon.

10. The multiport rotary valve as set forth in claim 7 wherein said plurality of outlet passages provided in said gasket carrier and said gasket are at least equal in number to said plurality of outlet passages provided in said end plate for connection to pipes.

* * * * *